US008634644B2

(12) United States Patent
Chiu et al.

(10) Patent No.: US 8,634,644 B2
(45) Date of Patent: Jan. 21, 2014

(54) SYSTEM AND METHOD FOR IDENTIFYING PICTURES IN DOCUMENTS

(75) Inventors: Patrick Chiu, Menlo Park, CA (US); Francine Chen, Menlo Park, CA (US); Laurent Denoue, Palo Alto, CA (US)

(73) Assignee: Fuji Xerox Co., Ltd., Tokyo (JP)

( * ) Notice: Subject to any disclaimer, the term of this patent is extended or adjusted under 35 U.S.C. 154(b) by 880 days.

(21) Appl. No.: 12/547,396

(22) Filed: Aug. 25, 2009

(65) Prior Publication Data

US 2011/0052062 A1 Mar. 3, 2011

(51) Int. Cl.
*G06K 9/34* (2006.01)
*G06K 9/46* (2006.01)
*G06K 7/10* (2006.01)

(52) U.S. Cl.
USPC ........... 382/180; 382/164; 382/176; 382/177; 382/190; 382/321

(58) Field of Classification Search
None
See application file for complete search history.

(56) References Cited

U.S. PATENT DOCUMENTS

| | | | | |
|---|---|---|---|---|
| 5,784,487 | A * | 7/1998 | Cooperman | 382/175 |
| 6,804,403 | B1 * | 10/2004 | Wang et al. | 382/240 |
| 7,782,339 | B1 * | 8/2010 | Hobbs et al. | 345/626 |
| 2002/0076105 | A1 * | 6/2002 | Lee | 382/190 |
| 2004/0223197 | A1 * | 11/2004 | Ohta et al. | 358/538 |
| 2006/0062456 | A1 | 3/2006 | Chiu et al. | |
| 2007/0217676 | A1 * | 9/2007 | Grauman et al. | 382/170 |
| 2009/0112830 | A1 | 4/2009 | Denoue et al. | |
| 2009/0324065 | A1 * | 12/2009 | Ishida et al. | 382/164 |
| 2010/0040287 | A1 * | 2/2010 | Jain et al. | 382/177 |

OTHER PUBLICATIONS

Berkner, K. et al., "SmartNails—Display and Image Dependent Thumbnails," Proceedings of SPIE '04, vol. 5296, pp. 53-65.
Bloomberg, D.S. et al., "Extraction of Text-Related Features for Condensing Image Documents," Proceedings of SPIE '96: Document Recognition III, pp. 72-88.
Chen, S. et al., "Simultaneous Layout Style and Logical Entity Recognition in a Heterogeneous Collection of Documents," Proceedings of ICDAR '07, vol. 1, pp. 118-122.
Fletcher, L. et al., "A Robust Algorithm for Text String Separation from Mixed Text/Graphics Images," IEEE Transactions on Pattern Analysis and Machine Intelligence, vol. 10, No. 6, Nov. 1988, pp. 910-918.
Hauser, S. et al., "Automated Zone Correction in Bitmapped Document Images," Proceedings of SPIE '00: Document Recognition and Retrieval VII, 2000, pp. 248-258.

(Continued)

*Primary Examiner* — Amir Alavi
*Assistant Examiner* — Kenny Cese
(74) *Attorney, Agent, or Firm* — Morgan, Lewis & Bockius LLP

(57) ABSTRACT

A system and method to identify pictures in documents. An image representing a page of a document is received. The image is analyzed to identify text objects in the page. A masked image is generated by masking out regions of the image including the text objects in the page. Groups of pixels in the masked image are identified, wherein a respective group of pixels corresponds to at least one picture in the page. When there is one or more groups of pixels, regions for pictures are identified based on the one or more groups of pixels. Metadata tags for the pictures are stored, wherein a respective metadata tag for a respective picture includes information about a respective bounding box for the respective picture.

23 Claims, 13 Drawing Sheets

(56) References Cited

OTHER PUBLICATIONS

Jain, A. et al., "Document Representation and Its Application to Page Decomposition," IEEE Trans. on Pattern Analysis and Machine Intelligence, vol. 20, No. 3, Mar. 1998, pp. 294-308.

Lu, Z., "Detection of Text Regions from Digital Engineering Drawings," IEEE Trans. on Pattern Analysis and Machine Intelligence, 20 (4), Apr. 1998, pp. 431-439.

Microsoft Office Document Imaging, http://office.microsoft.com/en-us/help/HP010771031033.aspx (linked visited May 7, 2009), 3 pgs.

Rahimi, A. et al., "Clustering with Normalized Cuts is Clustering with a Hyperplane," Statistical Learning in Computer Vision, 2004, 12 pages.

Shafait, F. et al., "Performance Evaluation and Benchmarking of Six-Page Segmentation Algorithms," IEEE Trans. on Pattern Analysis and Machine Intelligence, vol. 30, No. 6: Jun. 2008, pp. 941-954.

Shi, J. et al., "Normalized Cuts and Image Segmentation," IEEE Trans. on Pattern Analysis and Machine Intelligence, vol. 22, No. 8, Aug. 2000, pp. 1-52.

* cited by examiner

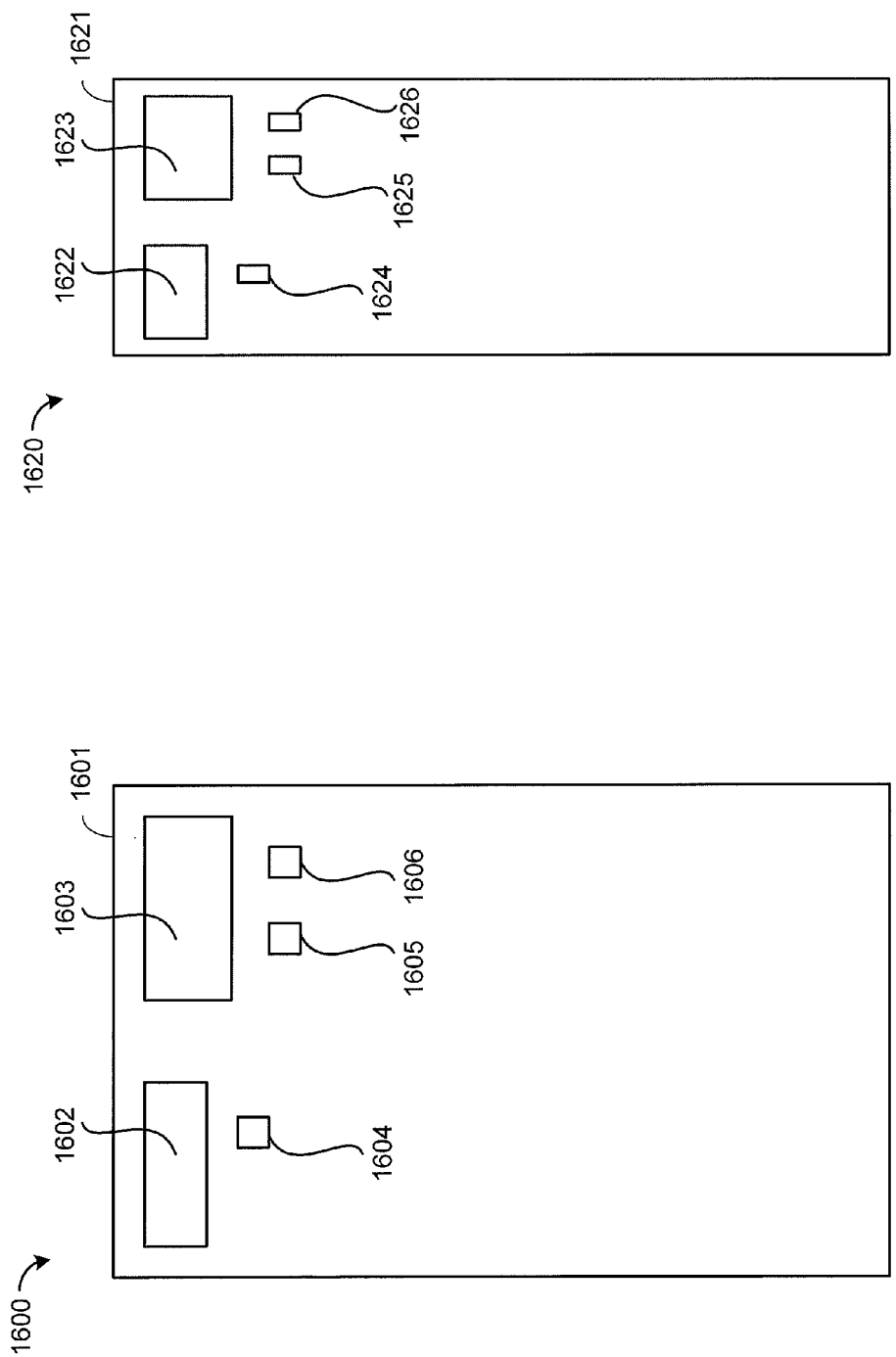

SYSTEM AND METHOD FOR IDENTIFYING PICTURES IN DOCUMENTS

TECHNICAL FIELD

The disclosed embodiments relate generally to identifying pictures in documents.

BACKGROUND

As online document management systems become more prevalent, more users are storing their documents online. To facilitate browsing and/or searching of these documents, it is desirable to index these documents. For an electronic document (e.g., a document that is created by a word processing program on a computer system), indexing text and/or pictures is straightforward since information about text objects and pictures may be obtained directly from the document structure of the electronic document. However, a scanned document (e.g., a document that is converted into electronic form using a scanner, etc.) is an image of the original document that does not include information about the text objects and pictures. Thus, to index a scanned document, text objects and/or pictures must first be identified.

One technique for identifying text objects and/or pictures is to use an optical character recognition (OCR) technique. OCR techniques typically segment a scanned document into zones containing text and non-text objects. However, OCR techniques are not meant to identify pictures. The non-text zones often do not correspond to pictures. For example, non-text zones may include decorative graphics (e.g., lines, etc.) and other symbols that are not pictures. For a more complicated example, a block diagram typically contains sub-regions of text within the block diagram that makes it difficult for the OCR technique to properly identify the block diagram as a picture object.

Geometric-based techniques for identifying pictures in a scanned document may also be used. For example, geometric features of connected components in the scanned document may be used. Morphology or layout analysis may also be used to identify pictures in the scanned document. However, these techniques may not properly identify pictures. For example, two pictures that are located close to each other in the scanned document may be interpreted as a single picture object. Similarly, a single picture object that includes whitespace in the center may be interpreted as two separate pictures.

Another technique identifies pictures in images of presentation slides by using an OCR technique and Hough transforms. To identify regions of interest, morphological clustering can also be used. However, these techniques use a sequence of pages of the presentation slides to identify the background. Thus, this technique can not be used on individual pages.

Hence, a system and a method for identifying pictures in a document without the aforementioned problems are highly desirable.

SUMMARY

To address the aforementioned problems, some embodiments provide a system, a computer-implemented method, and a computer-readable storage medium including instructions to identify pictures in documents. An image representing a page of a document is received. The image is analyzed to identify text objects in the page. A masked image is generated by masking out regions of the image including the text objects in the page. Groups of pixels in the masked image are identified, wherein a respective group of pixels corresponds to at least one picture in the page. When there is one or more groups of pixels, regions for pictures are identified based on the one or more groups of pixels. Metadata tags for the pictures are stored, wherein a respective metadata tag for a respective picture includes information about a respective region for the respective picture.

In some embodiments, the text objects in the page are identified by using an optical character recognition technique to analyze the image to identify.

In some embodiments, the regions of the image including the text objects in the page are masked out by identifying a background color of the image and setting color values of pixels to a color value of the background color for pixels that are within the regions of the image including the text objects.

In some embodiments, the regions of the image including the text objects in the page are masked out by identifying a background color of the image and setting color values of pixels to a color value of the background color for pixels that are within the regions of the image enclosed by bounding boxes for the text objects.

In some embodiments, the masked image is downsampled prior to identifying the one or more groups of pixels in the masked image.

In some embodiments, the masked image is smoothed prior to downsampling the masked image.

In some embodiments, the masked image is binarized prior to identifying the one or more groups of pixels in the masked image by setting color values of pixels to 1 for pixels whose color value is not within a predetermined threshold of a color value of a background color of the image, and setting color values of pixels to 0 for pixels whose color value is within the predetermined threshold of the color value of the background color of the image.

In some embodiments, the number of pixels having the color value of 1 is reduced.

In some embodiments, the number of pixels having the color value of 1 is reduced by removing interior pixels.

In some embodiments, interior pixels are removed by using a morphological erosion residue edge detector.

In some embodiments, noise is removed from the masked image prior to identifying the one or more groups of pixels in the masked image.

In some embodiments, decorative graphics are removed from the masked image prior to identifying the one or more groups of pixels in the masked image.

In some embodiments, one or more groups of pixels in the masked image are identified by grouping the pixels using a modified Normalized Cuts technique.

In some embodiments, the pixels are grouped using the modified Normalized Cuts technique by rescaling the masked image based on the dimensions of connected components to produce a rescaled masked image, applying a Normalized Cuts technique to obtain a sequence of clusterings of pixels for the rescaled masked image, wherein the sequence of clusterings includes N elements, wherein a respective element k in the sequence of clusterings includes k clusters, and wherein k is an integer such that $0 < k \leq N$; and identifying an element of the sequence of clusterings that satisfies predetermined criteria.

In some embodiments, the predefined criteria include an element of the sequence of clusterings that maximizes a change in a distance between clusters in adjacent elements in the sequence of clusterings.

In some embodiments, the regions for the pictures are identified based on the one or more groups of pixels by refining the one or more groups of pixels to correct for under-segmentation and over segmentation and identifying the regions for the pictures based on the one or more refined groups.

In some embodiments, the one or more groups of pixels are refined by identifying caption text for the pictures on the page and adjusting the one or more groups based on the caption text.

In some embodiments, the one or more groups are adjusted based on the caption text by combining a subset of the one or more groups.

In some embodiments, the one or more groups are adjusted based on the caption text by splitting apart a subset of the one or more groups.

In some embodiments, the caption text for the pictures on the page are identified by using an optical character recognition technique on the image representing the page to identify text from the image within a predetermined distance from the one or more groups, and performing a string matching operation on the extracted text to identify predetermined text tokens indicative of the caption text.

In some embodiments, respective caption text is stored with a respective metadata tag of a respective picture.

BRIEF DESCRIPTION OF THE DRAWINGS

FIG. 16A is a block diagram illustrating an exemplary masked image, according to some embodiments.

FIG. 16B is a block diagram illustrating a rescaled version of the exemplary masked image of FIG. 16A, according to some embodiments.

Like reference numerals refer to corresponding parts throughout the drawings.

DESCRIPTION OF EMBODIMENTS

To address the aforementioned problems, some embodiments provide a system and a method for identifying pictures in a document. In some embodiments, caption text associated with the pictures in a document is also identified. In some embodiments, metadata for the identified pictures are generated. This metadata may include location information indicating the position of the identified pictures within the page and/or caption text (or a subset of the caption text) associated with the identified pictures. Identifying pictures is beneficial because it facilitates indexing, accessing, searching and browsing of documents. Furthermore, identifying pictures in documents improves the document viewing experience on small and large displays by allowing the content of the document to be reformatted and visualized in ways more suitable for the target display device. Moreover, social and collaborative applications around documents can also make use of picture identifications and tagging.

In general, the content of a document may include text and graphics. Graphics include pictures and graphical elements. Pictures include natural images such as photographs and synthetic images such as figures, tables, block diagrams, screenshots, charts, logos, and the like. Graphical elements include decorative elements such as long lines and other non-text and non-picture elements.

Figure 1:
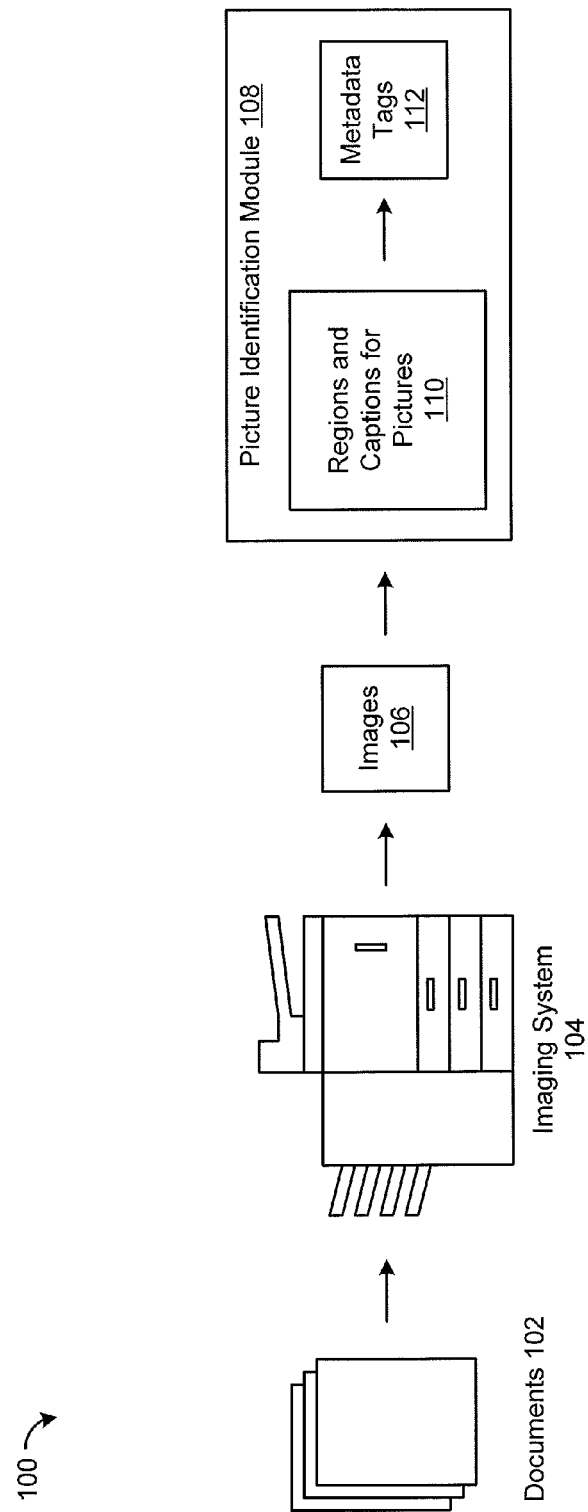
FIG. 1 is a block diagram illustrating an imaging system, according to some embodiments.

FIG. 1 is a block diagram 100 illustrating an imaging system 104, according to some embodiments. In some embodiments, the imaging system 104 receives documents 102 and produces images 106. For example, the imaging system 104 may scan the documents and produce the images 106. In some embodiments, the images 106 include images encoded in a digital format. The digital encoding may include encodings such as bitmap, JPEG, GIF, TIFF, PDF, PNG, and the like. Note that this specification uses the term "image" to refer to an image of a page of a document.

In some embodiments, the documents 102 are electronic documents. In these embodiments, the documents 102 are converted into the images 106. In some embodiments, an electronic document is a document that includes text and/or pictures encoded in a digital format. For example, text may be encoded in a digital character encoding such as ASCII, Unicode, and the like. Pictures in the electronic documents may be encoded as vector graphics, bitmaps, JPEG, TIFF, and the like.

In some embodiments, the imaging system 104 includes an imaging device. For example, the imaging device may include as a copier, a scanner, a facsimile machine, a digital camera, a camcorder, and a mobile phone. In these embodiments, the imaging device produces a digital image of the document.

In some embodiments, the picture identification module 108 identifies regions (e.g., bounding boxes) and caption text for pictures 110 in the images 106. In some embodiments, the picture identification module 108 is included in a computer system (e.g., a personal computer, a server, etc.). In some embodiments, the picture identification module 108 is included in the imaging system 104. In some embodiments, the picture identification module 108 is included in a mobile electronic device (e.g., a mobile phone, a digital camera, etc.). If the picture identification module 108 is separate from the imaging system 104, the images 106 may be transmitted to the picture identification module 108 through a network. Note that the network can generally include any type of wired or wireless communication channel capable of coupling together computing nodes. This includes, but is not limited to, a local area network, a wide area network, or a combination of networks. In some embodiments, the network includes the Internet. Alternatively, the images 106 may be delivered to the picture identification module 108 using physical media (e.g., CD ROMs, DVDs, flash drives, floppy disks, hard disks, etc.).

In some embodiments, the picture identification module 108 creates metadata tags 112 for identified pictures. The picture identification module 108 is described in more detail with respect to FIGS. 2-15 below.

Figure 2:
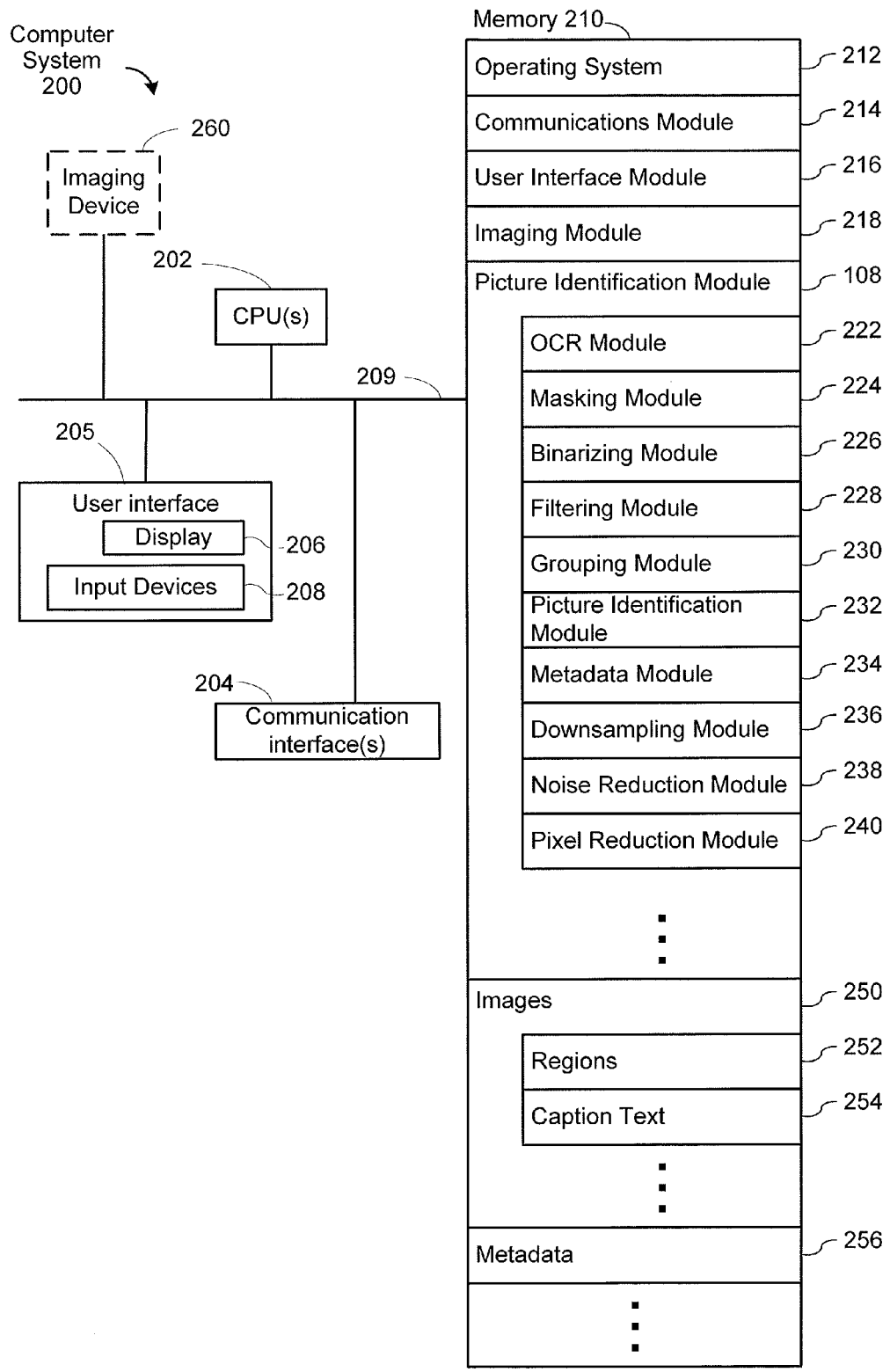
FIG. 2 is a block diagram illustrating a computer system, according to some embodiments.

FIG. 2 is a block diagram illustrating a computer system 200, according to some embodiments. The computer system 200 may be the imaging system 104 in FIG. 1 or may be a standalone computer system. The computer system 200 typically includes one or more processing units (CPU's) 202, one or more network or other communications interfaces 204, memory 210, and one or more communication buses 209 for interconnecting these components. The communication buses 209 may include circuitry (sometimes called a chipset) that interconnects and controls communications between system components. The computer system 200 optionally may include a user interface 205 comprising a display device 206 and input devices 208 (e.g., keyboard, mouse, touch screen, keypads, etc.). In some embodiments, the computer system 200 includes an imaging device 260 (e.g., a scanner, etc.). Memory 210 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 210 may optionally include one or more storage devices remotely located from the CPU(s) 202. Memory 210, or alternately the non-volatile memory device(s) within memory 210, comprises a computer readable storage medium. In some embodiments, memory 210 stores the following programs, modules and data structures, or a subset thereof:
- an operating system 212 that includes procedures for handling various basic system services and for performing hardware dependent tasks;
- a communication module 214 that is used for connecting the computer system 200 to other computers via the one or more communication interfaces 204 (wired or wireless) and one or more communication networks, such as the Internet, other wide area networks, local area networks, metropolitan area networks, and so on;
- a user interface module 216 that receives commands from the user via the input devices 208 and generates user interface objects in the display device 206;
- an imaging module 218 that interfaces with the imaging device 260;
- a picture identification module 108 that identifies pictures in documents, as described in more detail below, the picture identification module 108 including:
  - an optical character recognition (OCR) module 222 that identifies text objects in an image,
  - a masking module 224 that masks regions of an image,
  - a binarizing module 226 that sets color values of pixels to 1 or to 0 based on predetermined criteria,
  - a filtering module 228 that smoothes an image,
  - a grouping module 230 that groups pixels in an image,
  - a picture identification module 232 that identifies individual pictures from grouped pixels,
  - a metadata module 234 that generates and stores metadata (or metadata tags) for identified pictures,
  - a downsampling module 236 that downsamples an image,
  - a noise reduction module 238 that removes noise and/or decorative graphics from an image, and
  - a pixel reduction module 240 that reduces the number of pixels in an image; and
- images 250 of document pages, including regions 252 and associated caption text 254 for identified pictures; and metadata 256.

In some embodiments, the metadata 256 for an identified picture includes coordinates for the regions 252 and the associated caption text 252. In some embodiments, the metadata 256 are included in files for the images 250. For example, the metadata 256 may be stored in a specified metadata portion of the file for an image. In some embodiments, the metadata 256 are stored separately from the images 250. For example, the metadata 256 may be stored in a database or in one or more documents. In these embodiments, respective metadata for a respective image includes information that identifies a location at which the respective image is stored (e.g., a URL, a file system path, etc.). In some embodiments, the metadata 256 includes tags (e.g., XML tags) used to specify attributes and values for the metadata 256.

Each of the above identified elements may be stored in one or more of the previously mentioned memory devices, and corresponds to a set of instructions for performing a function described above. The set of instructions can be executed by one or more processors (e.g., the CPUs 202). The above identified modules or programs (i.e., sets of instructions) need not be implemented as separate software programs, procedures or modules, and thus various subsets of these modules may be combined or otherwise re-arranged in various embodiments. In some embodiments, memory 210 may store a subset of the modules and data structures identified above. Furthermore, memory 210 may store additional modules and data structures not described above.

Although FIG. 2 shows a "computer system," FIG. 2 is intended more as functional description of the various features which may be present in a computer system than as a structural schematic of the embodiments described herein. In practice, and as recognized by those of ordinary skill in the art, items shown separately could be combined and some items could be separated. For example, some items shown separately in FIG. 2 could be implemented on a single computer system and single items could be implemented by one or more computer systems.

FIGS. 3-9 illustrate methods for identifying pictures in a document, according to some embodiments. Some operations of FIGS. 3-9 are illustrated in, and described with reference to, FIGS. 10-16, which show different phases of processing an image of a document to identify pictures in the document.

Figure 3:
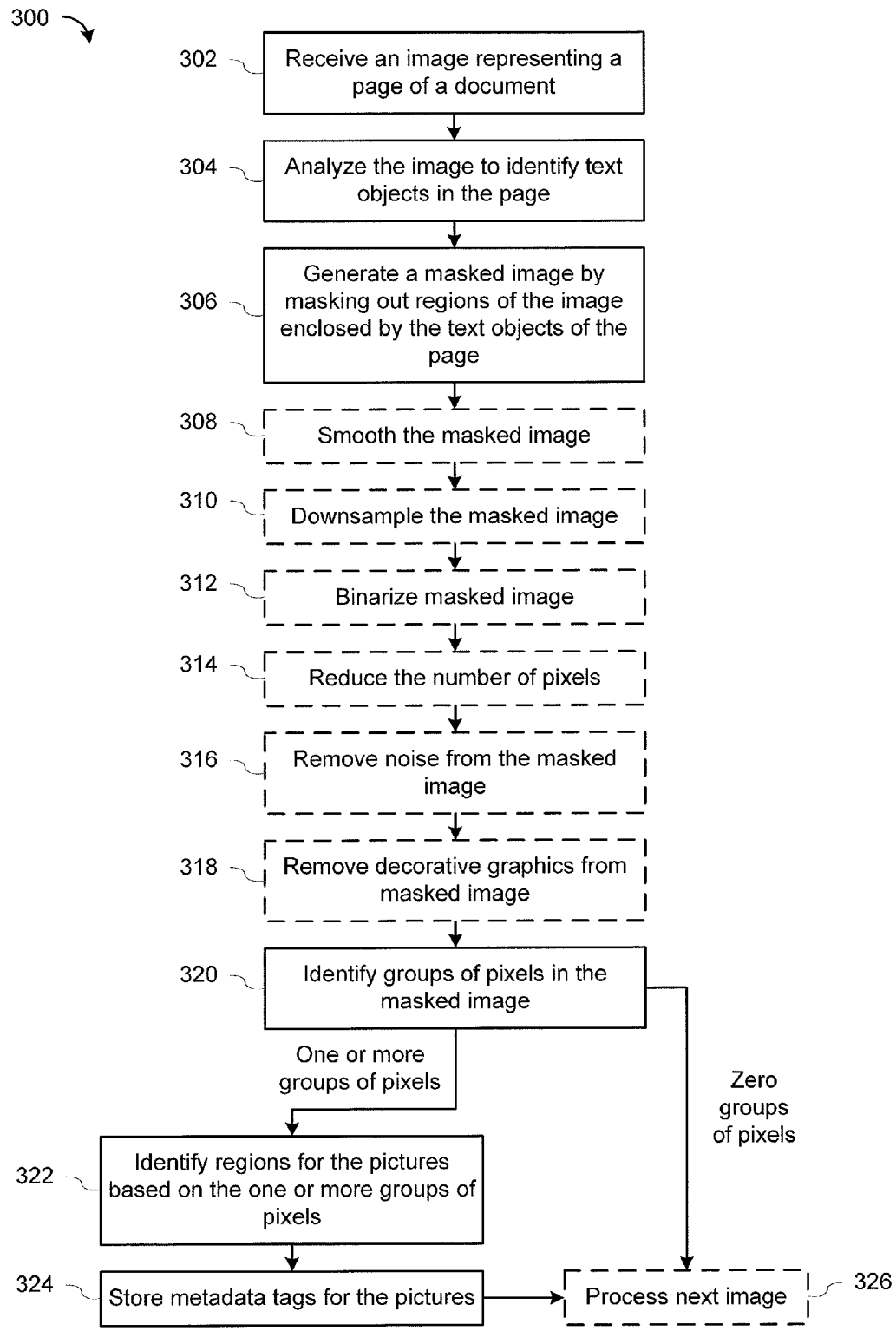
FIG. 3 is a flow chart of a method for identifying pictures in a document, according to some embodiments.
Figure 10:
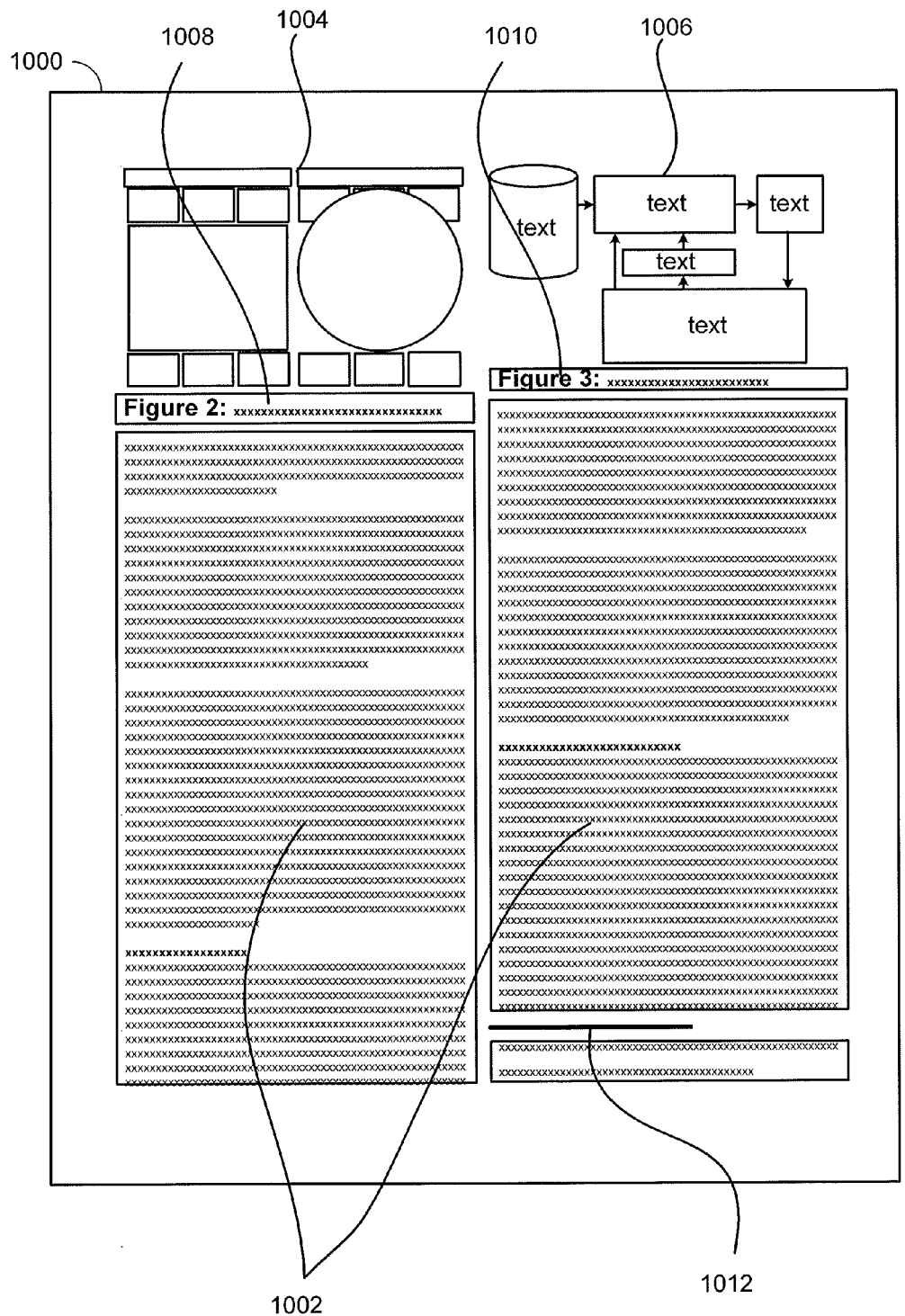
FIG. 10 illustrates an image representing a page of a document, according to some embodiments.

FIG. 3 is a flow chart of a method 300 for identifying pictures in a document, according to some embodiments. The picture identification module 108 receives (302) an image representing a page of a document, wherein the page may include text and pictures. For example, FIG. 10 illustrates an exemplary image 1000 representing a page of a document, according to some embodiments. As illustrated in FIG. 10, the image 1000 includes text objects 1002, pictures 1004 and 1006, caption text 1008 and 1010, and decorative graphics 1012. In some embodiments, the document is an electronic document (e.g., a PDF document, a spreadsheet, a presentation, a word processor document, etc.). In some embodiments, the image representing the page of the document is received from the imaging device 104 (e.g., a copier, a digital camera, a document scanner, etc.). In some embodiments, the image representing the page of the document is received from an application (e.g., Ghostscript, Xpdf, etc.) that render electronic documents into images.

Next, the OCR module 222 analyzes (304) the image to identify text objects in the page (e.g., the text objects 1002 in the image 1000). In some embodiments, the OCR module 222 uses an OCR technique to identify text objects in the page. In some embodiments, the OCR module 222 uses an OCR technique to identify bounding boxes for text objects in the page. A respective bounding box may be defined in terms of coordinates for two opposite corners of the respective bounding box or in terms of coordinates for all four corners of the respective bounding box. In some embodiments, the OCR technique identifies both text tokens (e.g., words) and bounding boxes in the page.

Figure 4:
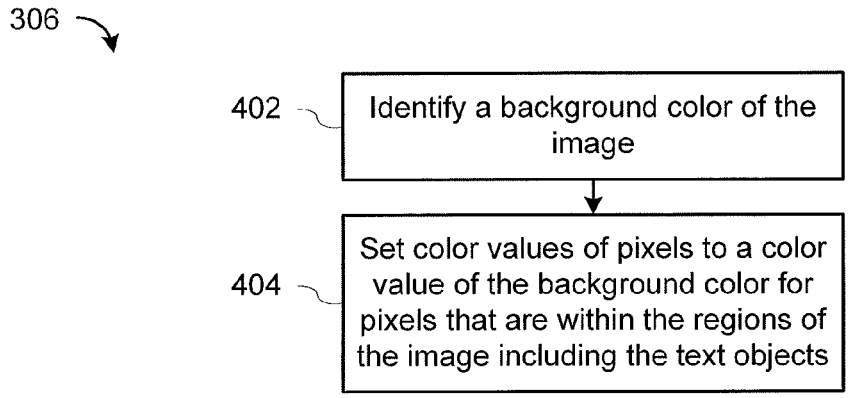
FIG. 4 is a flow chart of a method for generating a masked image of the document, according to some embodiments.
Figure 11:
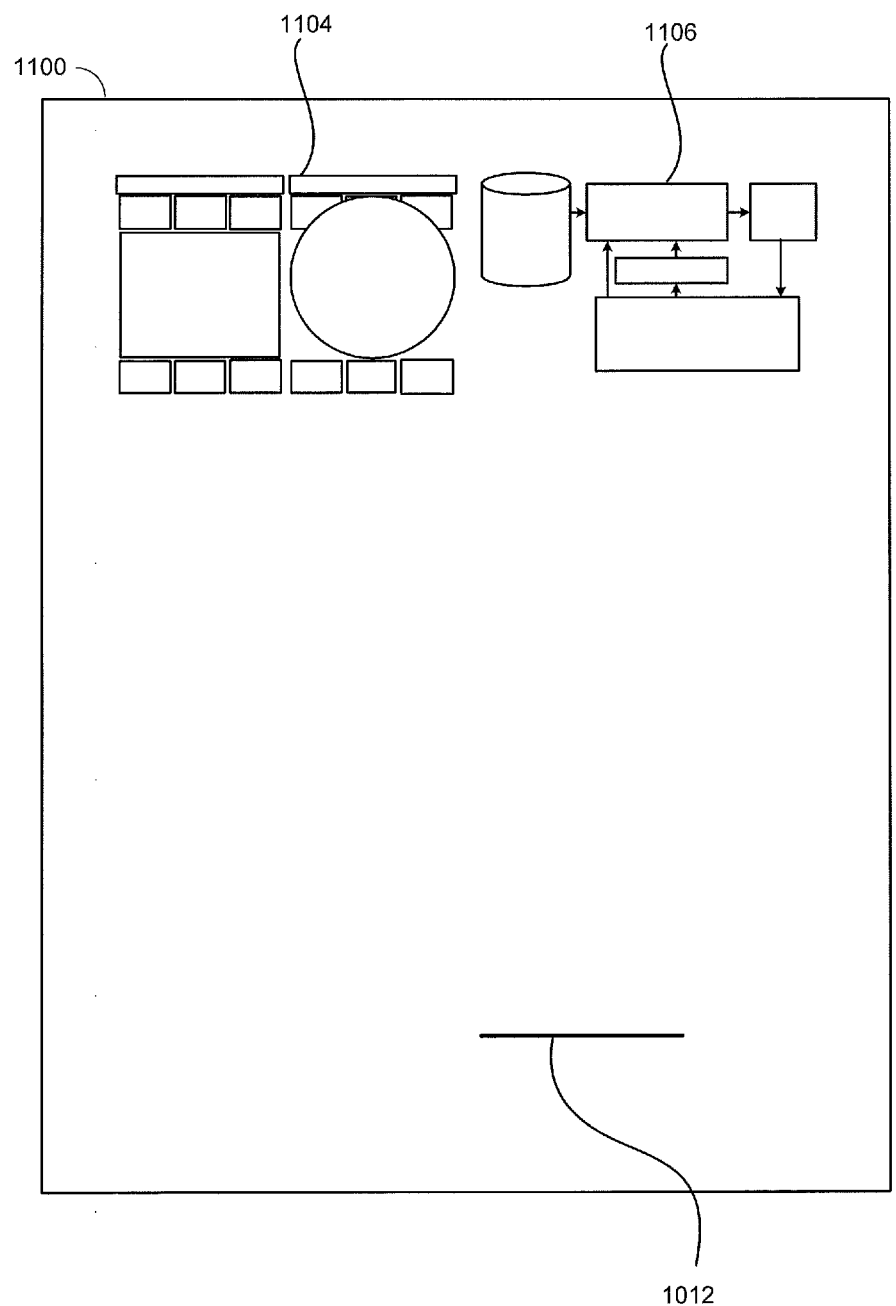
FIG. 11 illustrates a masked image of the page of the document, according to some embodiments.

The masking module 224 then generates (306) a masked image by masking out regions of the image including the text objects in the page. For example, the regions of the image including the text objects may be defined by bounding boxes for the text objects. The regions within these bounding boxes are then masked out. FIG. 4 is a flow chart of a method for generating (306) the masked image of the document, according to some embodiments. The masking module 224 identifies (402) a background color of the image and sets (404) color values of pixels to a color value of the background color for pixels that are within the regions of the image including the text objects. Alternatively, the masking module 224 sets (404) color values of pixels to a color value of the background color for pixels that are within the regions of the image enclosed by bounding boxes for the text objects. FIG. 11 illustrates a masked image 1100 of the page of the document, according to some embodiments. As illustrated in FIG. 11, the text objects 1002 the caption text 1008 and 1010 of the image 1000 have been masked out to produce the masked image 1100, which includes pictures 1104 and 1106, corresponding to the pictures 1004 and 1006, respectively, and the decorative graphics 1012. Although some text in the picture 1006 has been masked out, as compared to FIG. 10, the techniques described below can still properly identify the picture 1006.

Steps 308-318 are optional operations. Any combination of these operations may be performed on the masked image. In some embodiments, steps 308-318 are performed in order.

In some embodiments, the filtering module 228 smoothes (308) the masked image. In some embodiments, the filtering module 228 uses a low-pass filter to smooth the masked image. Using the low-pass filter to smooth the masked image reduces the aliasing in the masked image.

In some cases, the image of the page may be a high-resolution image (e.g., 1700×2200 pixels from a scanner). Since the embodiments described herein do not require high precision that is achieved by using high-resolution images, in some embodiments, the downsampling module 236 downsamples (310) the masked image. For example, the masked image may be downsampled to a resolution of 120×155 pixels.

Figure 5:
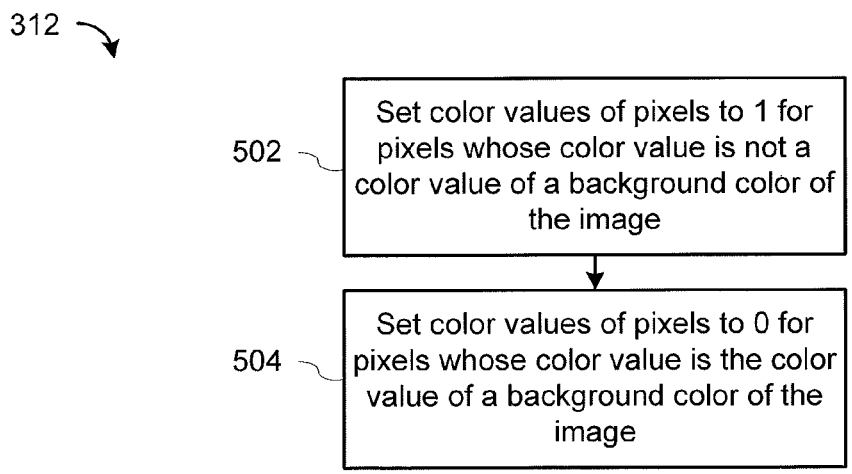
FIG. 5 is a flow chart of a method for binarizing a masked image of the document, according to some embodiments.
Figure 12:
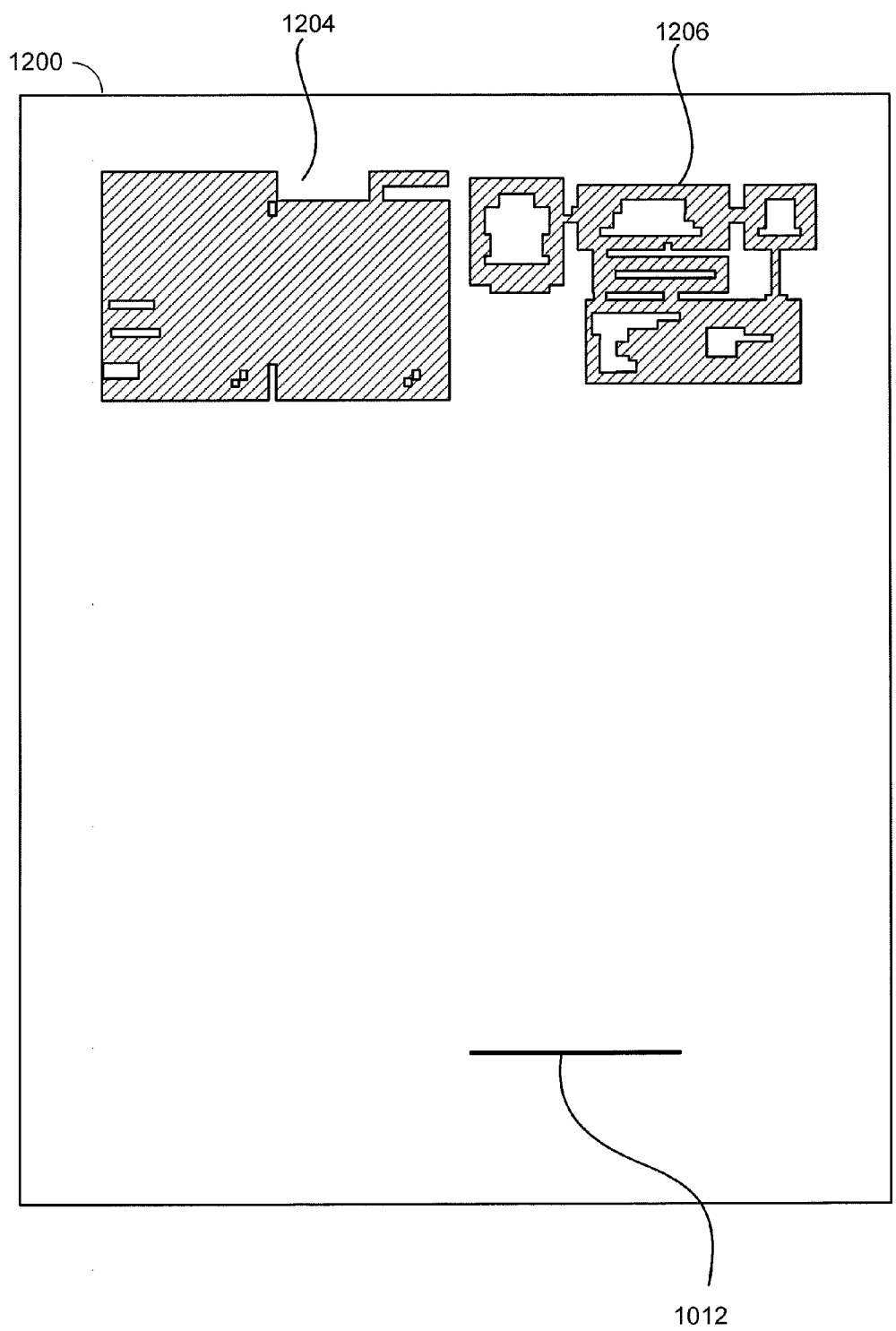
FIG. 12 illustrates a binarized image of the masked image of the page of the document, according to some embodiments.

The embodiments disclosed herein do not require color information in order to identify pictures in the image of the page. Thus, in some embodiments, the binarizing module 226 binarizes (312) the masked image. Binarizing the masked image converts a pixel into a 1-pixel (i.e., a foreground pixel) or a 0-pixel (e.g., a background pixel) based on whether the pixel determined to be is in the foreground or the background. FIG. 5 is a flow chart of a method for binarizing (312) a masked image of the document, according to some embodiments. The binarizing module 226 sets (502) color values of pixels to 1 for pixels (i.e., 1-pixels) whose color value is not within a predetermined threshold of a color value of a background color of the image, and sets (504) color values of pixels to 0 for pixels (i.e., 0-pixels) whose color value is within the predetermined threshold of the color value of the background color of the image. In some embodiments, the color value of the background color of the image is determined by identifying the most frequent color value of pixels in the masked image. FIG. 12 illustrates a binarized image 1200 of the masked image 1100 of the page of the document, according to some embodiments. As illustrated in FIG. 12, color values for all pixels that have color values that are not the color value of the background color (e.g., white) or that are not within a predetermined threshold of the color value of the background color are set to 1. The color values of the other pixels are set to 0. Thus, pixels for pictures 1204 and 1206, corresponding to the pictures 1004 and 1006, respectively, and the decorative graphics 1012 are set to 1. Color values for all other pixels are set to 0.

Figure 13:
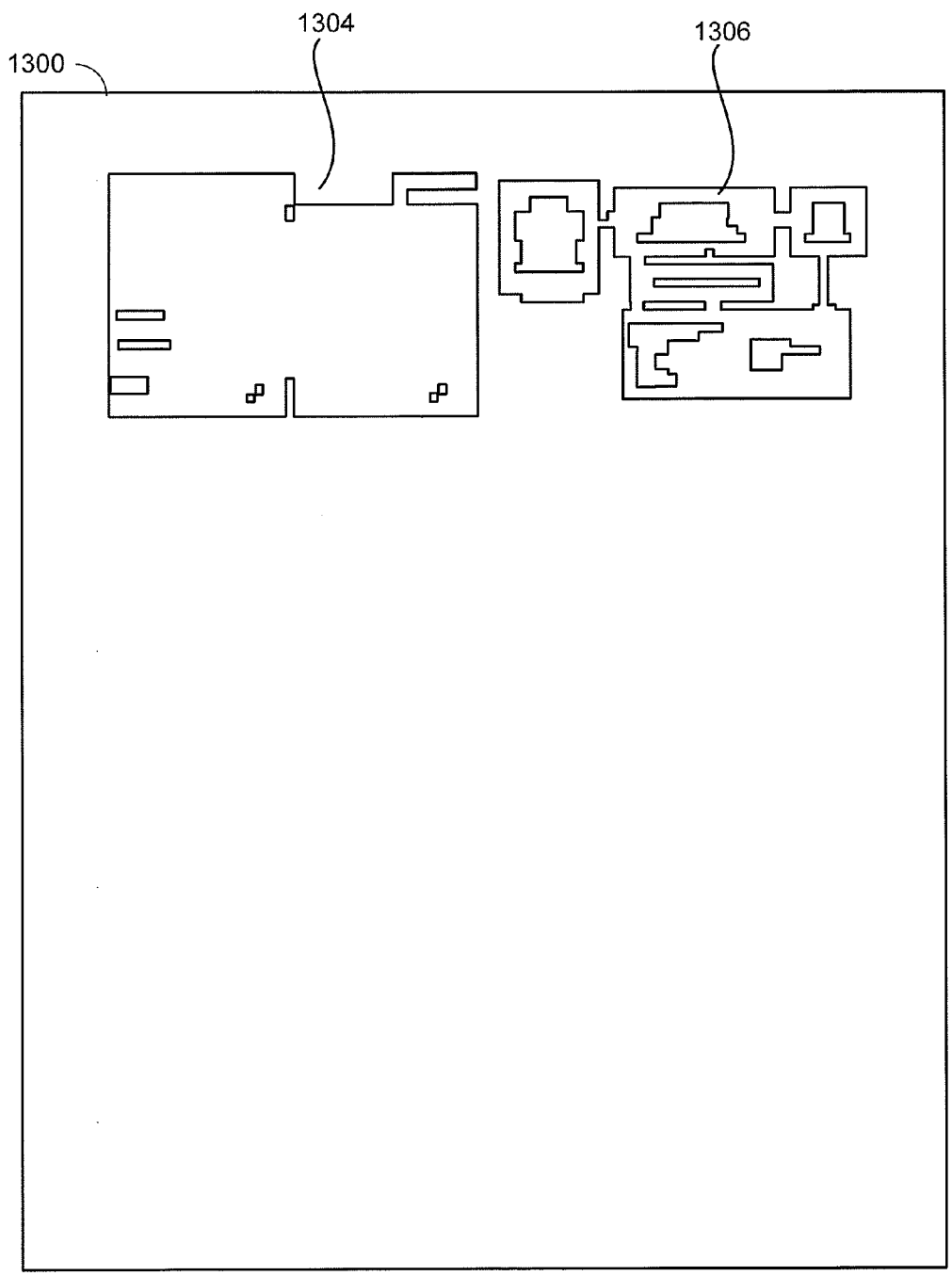
FIG. 13 illustrates a binarized image with a reduced number of pixels, according to some embodiments.

In some embodiments, the pixel reduction module 240 reduces (314) the number of pixels in the masked image having the color value of 1 (i.e., the 1-pixels) so there are fewer pixels to process. Thus, these embodiments are beneficial when the processing is performed on a device with limited or reduced processing capabilities (e.g., a copier, a scanner, a digital camera, a mobile phone, etc.). Note that even in devices that have sufficient processing capabilities (e.g., a computer system including multiple processors and/or a processor including multiple cores), reducing the number of pixels in the masked image reduces the processor time required to identify pictures in an image of a document. In some embodiments, the pixel reduction module 240 only removes interior pixels having the color value of 1 (i.e., the 1-pixels). In some embodiments, the interior pixels are removed using a morphological erosion residue edge detector. In some embodiments, an interior 1-pixel is a 1-pixel that has neighboring 1-pixels to the north, east, west, and south (i.e., 4-connected points). In some embodiments, an interior 1-pixel is a 1-pixel that has neighboring 1-pixels to the north, east, west, south, north-east, north-west, south-east, and south-west (i.e., 8-connected points). By removing the interior 1-pixels, it is possible to reduce the number of 1-pixels by a factor of a square root. In some embodiments, instead of removing all interior 1-pixels, only every other 1-pixel is removed (e.g., a checkerboard pattern). FIG. 13 illustrates a binarized image 1300 with a reduced number of pixels, according to some embodiments. As illustrated in FIG. 13, the interior 1-pixels of pictures 1304 and 1306, corresponding to the pictures 1004 and 1006, respectively, have been removed.

In some embodiments, the noise reduction module 238 removes (316) noise from the masked image and removes (318) decorative graphics from the masked image. For example, noise such as specks and other artifacts, and decorative graphics with high aspect ratios (e.g., long and thin lines, etc.) may be removed. As illustrated in FIG. 13, the noise reduction module 238 has removed the decorative graphics 1012.

Next, the grouping module 230 identifies (320) groups of pixels in the masked image, wherein a respective group of pixels corresponds to at least one picture in the page. In some embodiments, the groups of pixels are groups of 1-pixels in a binarized masked image of the page. In some embodiments, the grouping module 230 groups the pixels using a k-means clustering technique. In some embodiments, the grouping module 230 groups the pixels using a modified Normalized Cuts technique. In these embodiments, instead of using the standard Normalized Cuts technique in which each pixel in the image is a node in a weighted graph, the modified Normalized Cuts technique processes the image to obtain a reduced binarized image and clusters the 1-pixels.

Figure 6:
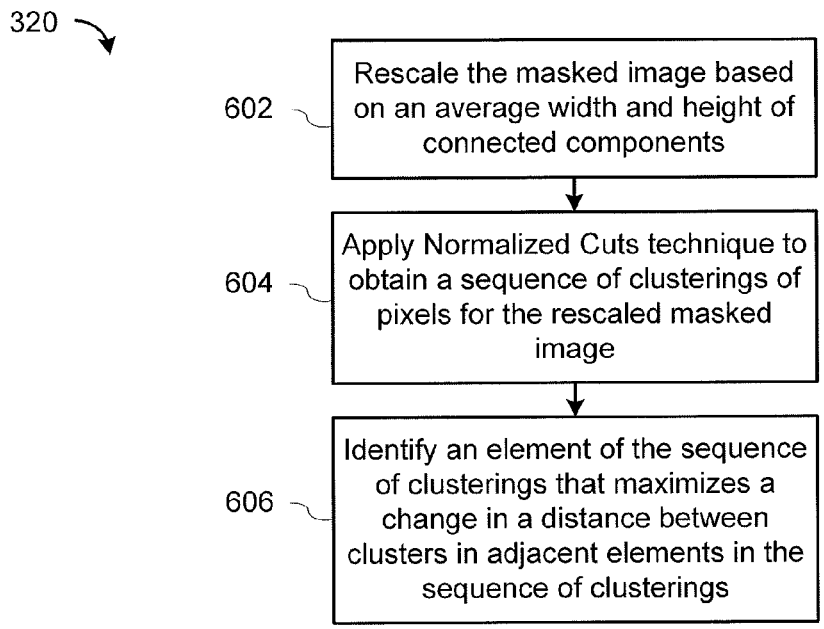
FIG. 6 is a flow chart of a method for identifying one or more groups of pixels in the masked image of the document, according to some embodiments.

FIG. 6 is a flow chart of a method for identifying (320) one or more groups of pixels in the masked image of the document using the modified Normalized Cuts technique, according to some embodiments. The grouping module 230 rescales (602) the masked image based on the dimensions of connected components to produce a rescaled masked image. The rescaling operation improves the behavior of the Normalized Cuts technique on elongated clusters. The standard Normalized Cuts technique can sometimes split elongated clusters. To remedy this problem, in some embodiments, the masked image is rescaled in x and y dimensions based on the average width and height of connected components, respectively. Note that connected components are identified by forming sets of 1-pixels, where each set of 1-pixels includes 1-pixels that have a continuous path to other 1-pixels in the set of 1-pixels through successive adjacent 1-pixels in the set of 1-pixels. For example, in some embodiments, the masked image is rescaled in x and y dimensions so that the average width and height of all connected components are equal. FIG. 16 is a block diagram 1600 illustrating an exemplary masked image 1601. The masked image 1601 includes groups of pixels 1602-1606. As illustrated in FIG. 16, the groups of pixels 1602 and 1603 are elongated. Thus, it is desirable to rescale the groups of pixels in x. FIG. 16B is a block diagram 1620 illustrating a rescaled masked image 1621, which is a rescaled version of the masked image 1601. In this example, the groups of pixels 1602-1606 are rescaled in x to produce rescaled groups of pixels 1622-1626, respectively. As can be seen the aspect ratio of the groups of pixels 1602 and 1603 have been reduced in FIG. 16B and are less elongated.

Next, the grouping module 230 applies (604) a Normalized Cuts technique to obtain a sequence of clusterings of pixels for the rescaled masked image, wherein the sequence of clusterings includes N elements, wherein a respective element k in the sequence of clusterings includes k clusters, and wherein k is an integer such that $0 < k \leq N$. For example, the fifth element in the sequence of clusterings includes five clusters of pixels. In other words, the Normalized Cuts technique is applied to the re-scaled pixels (e.g., 1-pixels) by specifying a sequence of k clusters, where k is the number of target clusters (i.e., $k=\{1, 2, 3, \ldots, N\}$). This process produces a sequence of clusterings $\{C_k\}$, where each clustering $C_k$ is made up of clusters $\{c_{k,i}\}$, where $i \leq k$. Note that the Normalized Cuts technique is described in more detail in Shi, Jianbo and Malik, Jitendra, *Normalized Cuts and Image Segmentation*, IEEE Transactions on Pattern Analysis and Machine Intelligence, Volume 22, No. 8, August 2000, which is hereby incorporated by reference in its entirety.

The grouping module 230 then identifies (606) an element of the sequence of clusterings that satisfies predetermined criteria. In some embodiments, the predefined criteria includes an element of the sequence of clusterings that substantially maximizes a change in the minimal (or average) distance between clusters in adjacent elements in the sequence of clusterings. In some embodiments, the predefined criteria are satisfied when the value of k maximizes the change in the distance between the clusters in $C_k$ and $C_{k-1}$. In some embodiments, if $C_{k+1}, C_{k+2}, \ldots, C_{k+M}$ have substantially the same increase in the minimal (or average) distance between the clusters, $C_{k+M}$ satisfies the predefined criteria.

Figure 14:
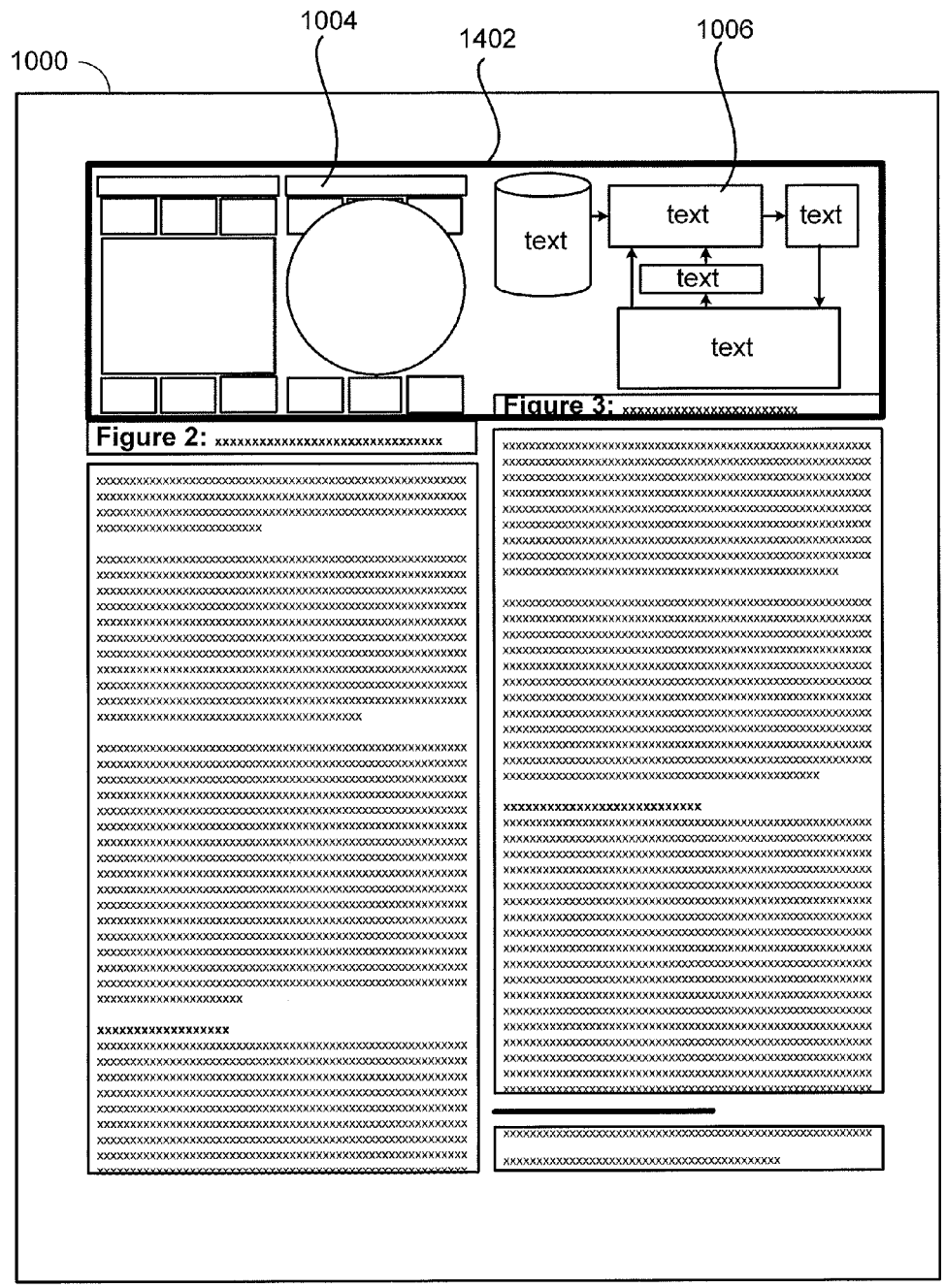
FIG. 14 illustrates a grouping of pixels, according to some embodiments.

FIG. 14 illustrates a grouping of pixels 1402 for the image 1000, according to some embodiments. As illustrated in FIG. 14, the grouping of pixels 1402 includes both the pictures 1004 and 1006, which is an example of under-segmentation. A process for correcting this condition is described with reference to FIG. 7 below.

Note that zero or more groups of pixels may be identified. For example, in a page of a document that includes only text, zero groups of pixels are produced since all of the pixels have previously been masked out (e.g., at step 306 of FIG. 3). In some embodiments, when there are zero groups of pixels, the picture identification module 108 stops processing the image and processes (326) the next image of a page of a document.

Figure 7:
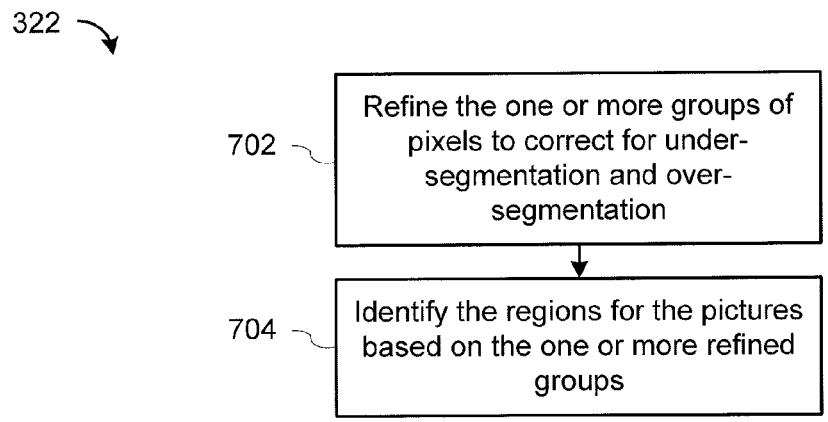
FIG. 7 is a flow chart of a method for identifying regions for pictures in the document, according to some embodiments.

When there are one or more groups of pixels, some groups of pixels may include more than one picture and some groups of pixels may include less than one picture. Thus, in some embodiments, when there are one or more groups of pixels the picture identification module 232 identifies (322) regions (e.g., bounding boxes) for the pictures based on the one or more groups of pixels. FIG. 7 is a flow chart of a method for identifying (322) regions for pictures in the document, according to some embodiments. The picture identification module 232 refines (702) the one or more groups of pixels to correct for under-segmentation and over-segmentation and identifies (704) the regions for the pictures based on the one or more refined groups. In some embodiments, the picture identification module 232 identifies coordinates for the regions for the pictures. For example, if the region is a rectangular region, the picture identification module 232 may identify coordinates for two opposite corners of bounding boxes for the pictures. Alternatively, the picture identification module 232 may identify coordinates for all four corners of the bounding boxes for the pictures. Note that a region for a picture may be a non-rectangular region (e.g., a circle, a polygon, or other shape, etc.).

Figure 8:
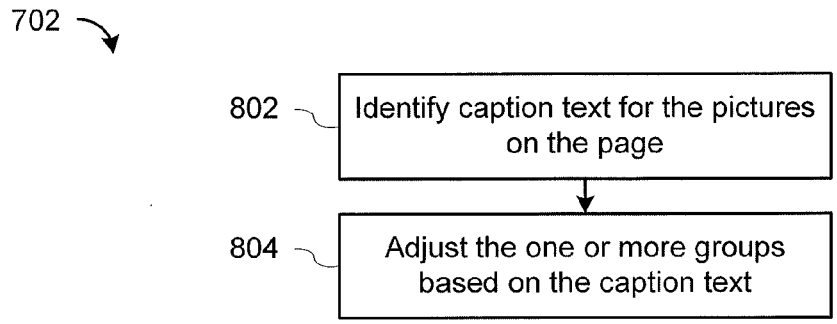
FIG. 8 is a flow chart of a method for refining one or more groups of pixels, according to some embodiments.

From the visual properties alone, it may be difficult to determine whether nearby groups of pixels need to be split or merged. Thus, some embodiments use caption text to determine how to refine nearby groups of pixels. FIG. 8 is a flow chart of a method for refining (702) one or more groups of pixels, according to some embodiments. The picture identification module 232 identifies (802) caption text for the pictures on the page. In some embodiments, an OCR technique is used to find caption text for the clusters. In these embodiments, a string matching operation is performed on the text identified by the OCR technique to identify words indicative of caption text. For example, the words indicative of caption text may include words such as "Figure", "Table", and the like. In some embodiments, the string matching operation includes wild cards to handle characters that may be mistakenly recognized by the OCR technique. Using the location of the text tokens (or "words") on the page image identified by the OCR technique, the text tokens (or words) that are farther than a predetermined distance from a cluster or that do not begin a line adjacent to a cluster are eliminated. In some embodiments, if font information (e.g., italics, bold, etc.) is available, the font information may be used to identify words indicative of caption text. For example, the word "Figure" may be bolded. For each of these identified words indicative of caption text, a caption object is created that includes the word(s) indicative of caption text and the sentence containing the word(s).

Figure 15:
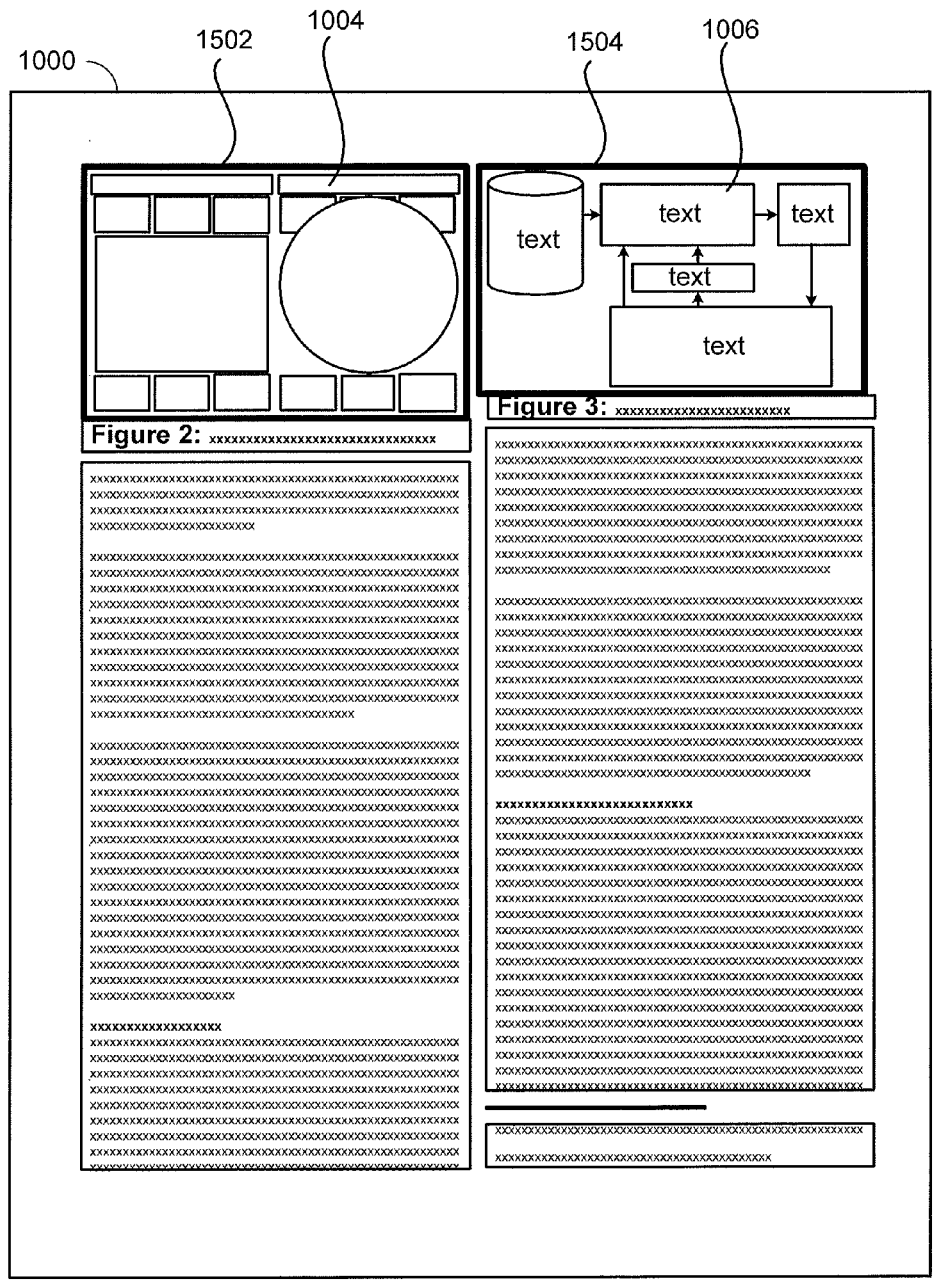
FIG. 15 illustrates another grouping of pixels, according to some embodiments.

After identifying the caption text for the pictures, the picture identification module 232 adjusts (804) the one or more groups based on the caption text. For example, a group of pixels that has two caption text (e.g., caption text including the word "Figure", etc.) nearby is likely to contain two pictures and therefore is split. In some embodiments, caption text is identified by identifying words indicative of pictures from the text near the groups of pixels. In some embodiments, the picture identification module 232 combines a subset of the one or more groups to adjust the one or more groups based on the caption text. In some embodiments, the picture identification module 232 splits apart a subset of the one or more groups to adjust the one or more groups based on the caption text. FIG. 15 illustrates another grouping of pixels 1502 and 1504, according to some embodiments. The grouping of pixels 1402 was under-segmented. In other words, the grouping of pixels 1402 included more than one picture. As illustrated in FIG. 15, the refining process corrected the under-segmentation and produced the grouping of pixels 1502 and 1504 (e.g., according to the methods illustrated in FIGS. 7 and 8).

Figure 9:
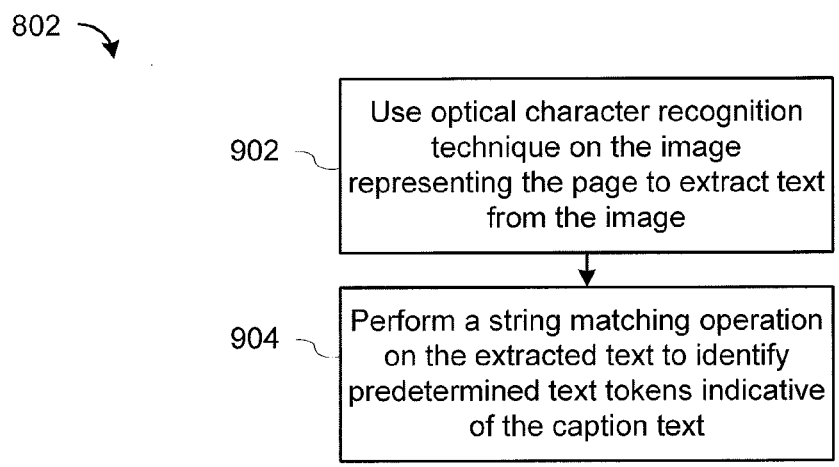
FIG. 9 is a flow chart of a method for identifying caption text for pictures on the page, according to some embodiments.

FIG. 9 is a flow chart of a method for identifying (802) caption text for pictures on the page, according to some embodiments. The picture identification module 232 uses (902) an optical character recognition technique on the image representing the page to identify text from the image within a predetermined distance from the one or more groups and performs (904) a string matching operation on the extracted text to identify predetermined text tokens indicative of the caption text. In some embodiments, the caption text for a respective picture is stored with respective metadata (or metadata tags) of the respective picture.

Returning to FIG. 3, the metadata module 234 stores (324) metadata 256 (or metadata tags) for the pictures, wherein a respective metadata (or a respective metadata tag) for a respective picture includes information about a respective region for the respective picture. In some embodiments, the metadata (or metadata tags) for a respective picture includes information about the location of the respective picture within the image of the page and at least a subset of the caption text corresponding to the respective picture. For example, metadata (or metadata tags) for a picture may include a set of coordinates that identifies the location of the region for the picture and descriptive text or keywords extracted from caption text corresponding to the picture. In some embodiments, XML tags are used. For example, an XML tag for a picture may be enclosed in a "<picture>" tag. Within the <picture> tag, the caption may be included in a "<caption>" tag. The <picture> tag may also include a "<location>" tag that specifies the coordinates of the region for the picture. A "<type>" tag may indicate the type of picture (e.g., a figure, a table, a block diagram, a flowchart, etc.).

In some embodiments, after the metadata tags for the pictures are stored, the picture identification module 108 processes (326) the next image of a page of a document.

In embodiments where masked image was downsampled, the locations of the pictures are remapped so that the locations of the pictures correspond to the locations of the pictures in the original image of the page. For example, the coordinates of the region for each identified picture is multiplied by a factor proportional to the amount that the masked image was downsampled. If the masked image was downsampled by a factor of two, the coordinates (both in x and y) of the region for each identified picture is multiplied by a factor of two.

In embodiments where the masked image was rescaled (602) based on the average width and height of the connected components, the location of the identified pictures are remapped based on the average width and height of the connected components so that the locations of the pictures correspond to the locations of the pictures in the original image of the page. For example, the x coordinate of the region for each identified picture are multiplied by the average width of the connected components and the y coordinate of the region for each identified picture is multiplied by the average height of the connected components.

The methods described in FIGS. 3-9 may be governed by instructions that are stored in a computer readable storage medium and that are executed by one or more processors of one or more servers. Each of the operations shown in FIGS. 3-9 may correspond to instructions stored in a computer memory or computer readable storage medium. The computer readable storage medium may include a magnetic or optical disk storage device, solid state storage devices such as Flash memory, or other non-volatile memory device or devices. The computer readable instructions stored on the computer readable storage medium are in source code, assembly language code, object code, or other instruction format that is interpreted and executable by one or more processors.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method for identifying pictures in documents, comprising:
at a computer system including one or more processors and memory storing one or more programs, the one or more processors executing the one or more programs to perform the operations of:
receiving an image representing a page of a document;
identifying a plurality of captions in the image;
identifying a respective portion of the image that includes non-text graphics;
determining that the respective portion of the image includes a plurality of distinct pictures based at least in part on the quantity and location of the previously identified plurality of captions in the image; and
storing metadata tags for pictures in the plurality of distinct pictures, wherein a respective metadata tag for a respective picture includes caption text for a respective caption associated with the respective picture;
wherein determining that the respective portion of the image includes the plurality of distinct pictures based at least in part on the quantity and location of the previously identified plurality of captions in the image includes:
determining a preliminary grouping of pixels in the respective portion of the image into one or more groups of pixels;
generating a refined grouping of pixels that groups pixels in the respective portion of the image into one or more groups of pixels, wherein the refined grouping of pixels corrects for under-segmentation and/or over segmentation in the preliminary grouping of pixels; and
identifying the plurality of distinct pictures based on the refined grouping of pixels.

2. The method of claim 1, wherein identifying the plurality of captions in the image includes using an optical character recognition technique.

3. The method of claim 1, wherein identifying the respective portion of the image that includes non-text graphics includes masking out regions of the image including text objects in the image, the masking out including:
identifying a background color of the image; and
setting color values of pixels to a color value of the background color for pixels that are within the regions of the image including the text objects.

4. The method of claim 1, wherein identifying the respective portion of the image that includes non-text graphics includes masking out regions of the image including text objects in the image, the masking out including:

identifying a background color of the image; and setting color values of pixels to a color value of the background color for pixels that are within the regions of the image enclosed by bounding boxes for the text objects.

5. The method of claim 1, further comprising, prior to identifying the respective portion of the image that includes non-text graphics, downsampling the image.

6. The method of claim 5, further comprising, prior to downsampling the image, smoothing the image.

7. The method of claim 1, further comprising, prior to identifying the respective portion of the image that includes non-text graphics, binarizing the image by:

setting color values of pixels to 1 for pixels whose color value is not within a predetermined threshold of a color value of a background color of the image; and setting color values of pixels to 0 for pixels whose color value is within the predetermined threshold of the color value of the background color of the image.

8. The method of claim 7, further comprising reducing the number of pixels having the color value of 1.

9. The method of claim 8, wherein reducing the number of pixels having the color value of 1 includes removing interior pixels.

10. The method of claim 9, wherein removing interior pixels includes using a morphological erosion residue edge detector to remove interior pixels.

11. The method of claim 1, further comprising, prior to identifying the respective portion of the image that includes non-text graphics, removing noise from the image.

12. The method of claim 1, further comprising, prior to identifying the respective portion of the image that includes non-text graphics, removing decorative graphics from the image.

13. The method of claim 1, wherein identifying the respective portion of the image that includes non-text graphics includes grouping pixels in the image using a modified Normalized Cuts technique.

14. The method of claim 13, wherein grouping the pixels using the modified Normalized Cuts technique includes:

rescaling the image based on the dimensions of connected components to produce a rescaled image;

applying a Normalized Cuts technique to obtain a sequence of clusterings of pixels for the rescaled image, wherein:
the sequence of clusterings includes N elements,
a respective element k in the sequence of clusterings includes k clusters, and
k is an integer such that $0 < k \leq N$; and identifying an element of the sequence of clusterings that satisfies predetermined criteria.

15. The method of claim 14, wherein identifying the element of the sequence of clusterings that satisfies the predefined criteria includes identifying an element of the sequence of clusterings that maximizes a change in a distance between clusters in adjacent elements in the sequence of clusterings.

16. The method of claim 1, wherein generating the refined grouping of pixels includes:

comparing the number of groups of pixels in the preliminary grouping with the quantity of captions that correspond to the respective portion of the image; and in accordance with a determination that the number of groups of pixels in the preliminary grouping is different from the quantity of captions that correspond to the respective portion of the image, adjusting the one or more groups based on the comparison, so that the number of groups of pixels in the refined grouping is the same as the quantity of captions that correspond to the respective portion of the image.

17. The method of claim 16, wherein adjusting the one or more groups based on the comparison includes combining a subset of the one or more groups of pixels in the preliminary grouping.

18. The method of claim 16, wherein adjusting the one or more groups based on the comparison includes splitting apart a subset of the one or more groups of pixels in the preliminary grouping.

19. The method of claim 1, wherein identifying the plurality of captions in the image includes:

using an optical character recognition technique on the image to identify respective text from the image within a predetermined distance from the respective portion of the image that includes non-text graphics; and performing a string matching operation on the respective text to identify predetermined text tokens indicative of the caption text; and for each of a plurality of text objects in the respective text, identifying the respective text object as a caption in accordance with a determination that the respective text object meets caption-identification criteria, the caption-identification criteria including that the respective text object includes one of the predetermined text tokens.

20. A system, comprising:

one or more processors;

memory; and one or more programs stored in the memory, the one or more programs comprising instructions to:
receive an image representing a page of a document;
identify a plurality of captions in the image;
identify a respective portion of the image that includes non-text graphics;
determine that the respective portion of the image includes a plurality of distinct pictures based at least in part on the quantity and location of the previously identified plurality of captions in the image; and
store metadata tags for pictures in the plurality of distinct pictures, wherein a respective metadata tag for a respective picture includes caption text for a respective caption associated with the respective picture;
wherein the instructions to determine that the respective portion of the image includes the plurality of distinct pictures based at least in part on the quantity and location of the previously identified plurality of captions in the image include instructions to:
determine a preliminary grouping of pixels in the respective portion of the image into one or more groups of pixels;
generate a refined grouping of pixels that groups pixels in the respective portion of the image into one or more groups of pixels, wherein the refined grouping of pixels corrects for under-segmentation and/or over segmentation in the preliminary grouping of pixels; and
identify the plurality of distinct pictures based on the refined grouping of pixels.

21. A non-transitory computer readable storage medium storing one or more programs configured for execution by a computer, the one or more programs comprising instructions to:

receive an image representing a page of a document;
identify a plurality of captions in the image;
identify a respective portion of the image that includes non-text graphics;

determine that the respective portion of the image includes a plurality of distinct pictures based at least in part on the quantity and location of the previously identified plurality of captions in the image; and store metadata tags for pictures in the plurality of distinct pictures, wherein a respective metadata tag for a respective picture includes caption text for a respective caption associated with the respective picture;

wherein the instructions to determine that the respective portion of the image includes the plurality of distinct pictures based at least in part on the quantity and location of the previously identified plurality of captions in the image include instructions to:

determine a preliminary grouping of pixels in the respective portion of the image into one or more groups of pixels;

generate a refined grouping of pixels that groups pixels in the respective portion of the image into one or more groups of pixels, wherein the refined grouping of pixels corrects for under-segmentation and/or over segmentation in the preliminary grouping of pixels; and identify the plurality of distinct pictures based on the refined grouping of pixels.

22. The method of claim 1, wherein determining that the respective portion of the image includes a plurality of distinct pictures based at least in part on the quantity and location of the previously identified plurality of captions in the image includes, for each caption of the plurality of captions, identifying a picture in the respective portion of the image that corresponds to the caption.

23. The method of claim 1, wherein the plurality of distinct pictures include one or more of: an image, a photograph, a figure, a table, a block diagram, a screen shot, a chart or a logo.

* * * * *